United States Patent
Otani et al.

[11] Patent Number: 6,115,156
[45] Date of Patent: Sep. 5, 2000

[54] DEMULTIPLEXER DEVICE FOR WAVELENGTH-DIVISION MULTIPLEXED OPTICAL FIBER COMMUNICATION

[75] Inventors: Tomohiro Otani, Hyogo; Toshio Kawazawa, Tokyo; Koji Goto, Saitama; Hiroharu Wakabayashi, Kanagawa, all of Japan

[73] Assignee: Kokusai Denshin Denwa Kabushiki Daisha, Tokyo, Japan

[21] Appl. No.: 08/964,528

[22] Filed: Nov. 5, 1997

[30] Foreign Application Priority Data

Aug. 11, 1996 [JP] Japan .................................... 8-312681

[51] Int. Cl.[7] ...................................................... H04J 14/02
[52] U.S. Cl. .......................... 359/124; 359/127; 359/128; 359/130
[58] Field of Search .................................... 359/127, 128, 359/129, 130, 131, 349; 385/24

[56] References Cited

U.S. PATENT DOCUMENTS 5,701,188  12/1997  Shigematsu et al. ................... 359/161

FOREIGN PATENT DOCUMENTS 2 309 131  7/1997  United Kingdom .

*Primary Examiner*—Jason Chan
*Assistant Examiner*—Dalzid Singh
*Attorney, Agent, or Firm*—Westman, Champlin & Kelly, P.A.

[57] ABSTRACT

A demultiplexer device is used in a wavelength-division multiplexed optical fiber communication line to achieve efficient dispersion compensation and loss compensation as well as a reduction of active devices such as optical amplifiers. The demultiplexer device has a series of couplers disposed in multi-stages from the input of the demultiplexer. Each coupler has two branches with one branch of each coupler connected to a separate optical filter and the other branches are series connected to a subsequent stage of the couplers through equalizing fibers, except for the final stage which has its second branch connected to an optical filter for the shortest wavelength transmitted. The equalizing fibers are thus serially connected between couplers and act to perform a cumulative dispersion compensation. The quantity of the equalizing fibers can thus be reduced as a whole, and as a result the attenuation amount also decreases, so that the number of optical amplifiers can be reduced.

4 Claims, 2 Drawing Sheets

F I G. 1
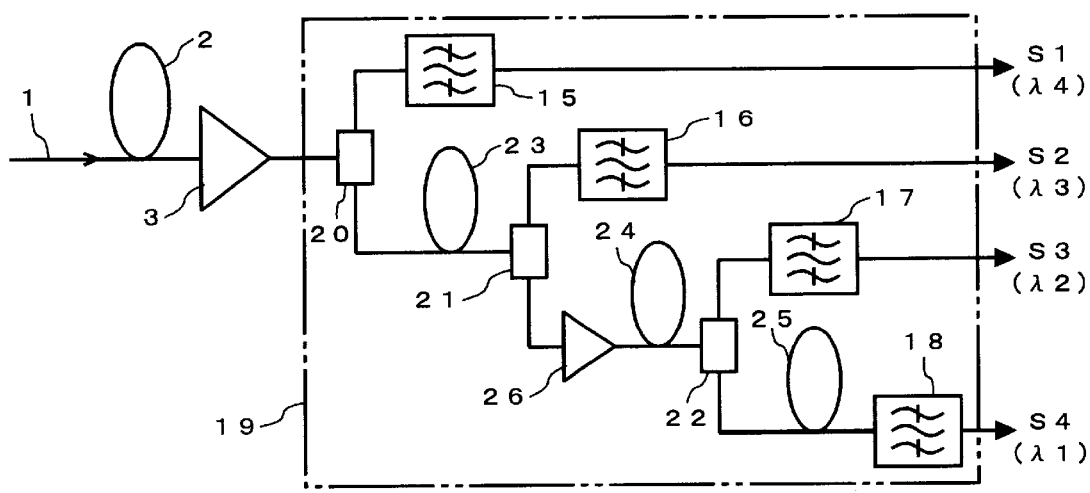
F I G. 2
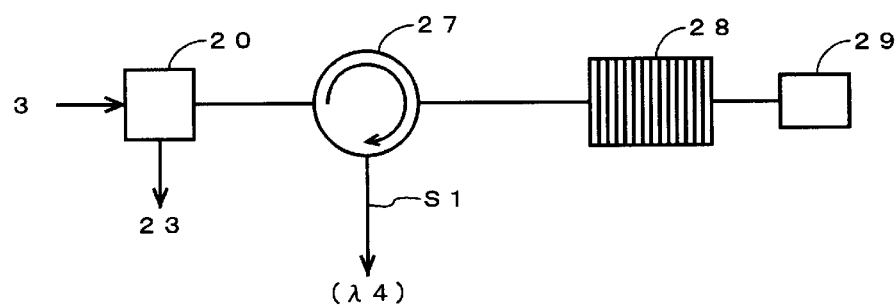

DEMULTIPLEXER DEVICE FOR WAVELENGTH-DIVISION MULTIPLEXED OPTICAL FIBER COMMUNICATION

BACKGROUND OF THE INVENTION

1. Field of the Invention

The present invention relates to demultiplexer device for wavelength-division multiplexed optical fiber communication, and particularly to demultiplexer device for wavelength-division multiplexed optical fiber communication which is advantageous for efficiently performing the dispersion compensation and loss compensation of an optical signal.

2. Description of the Related Art

In the conventional wavelength-division multiplexed optical fiber communication system, the following method was taken to demultiplex an optical wavelength-division multiplexed signal. FIG. 3 is a diagram showing the conventional demultiplexer device. An wavelength-division multiplexed optical signal transmitted through an optical fiber 1 is dispersion compensated by an optical fiber 2 for dispersion equalization (hereinafter simply referred to as "equalizing fiber"), and a loss during a transmission is compensated by amplification in a optical amplifier 3 and inputted to a demultiplexer device 4. In this example, the number of multiplexings is assumed to be "4".

The demultiplexer device 4 comprises an optical fiber coupler (hereinafter simply referred to as "coupler") 5, equalizing fibers 6 to 11, optical amplifiers 12 to 14, and optical fibers 15 to 18. The coupler 5 is a 1×4 coupler for branching the wavelength-division multiplexed optical signal into four directions. The wavelength-division multiplexed optical signal inputted to the demultiplexer device 4 is branched into four directions by the 1×4 coupler 5, and the respective wavelength-division multiplexed optical signals are inputted to the optical filters 15 to 18 and branched into optical signals S1 to S4 (wavelengths λ4 to λ1 correspond to the signals S1 to S4 respectively) according to the characteristics of the respective optical filters. The wavelengths of the respective optical signals are in a relationship of λ1<λ2<λ3<λ4, and the wavelength spacings are equal. Since generally an optical signal of a shorter wavelength is more susceptible to dispersion because of the zero dispersion wavelength of the transmission path, it requires a longer equalizing fiber.

Accordingly, as shown, equalizing fibers 6 to 11 are disposed in the channels corresponding to the optical signals S2 to S3 which have shorter wavelength. In particularly, channels for the optical signals with shorter wavelength have many equalizing fibers. No additional equalizing fiber is disposed for optical signal S1 with long wavelength, because the optical signal S1 is fully compensated for dispersion by the equalizing fiber 2. Since the equalizing fiber attenuates an optical signal, the optical amplifiers 12 to 14 are respectively disposed in the downstream of the equalizing fibers 6, 8 and 11. The optical fibers 15 to 18 may be provided immediately after the coupler 5.

The above conventional demultiplexer device has the following problems. As seen from FIG. 3, in the conventional demultiplexer device, it is needed to dispose equalizing fibers for the respective channels correspondingly to all the optical signals S2 to S4 other than the optical signal S1 with the longest wavelength. Further, it is required to dispose an optical amplifier for each channel as the dispersion equalizing optical filters are disposed. As a result, the number of parts increases and hence the improvement of the system efficiency and reliability cannot be expected, and there is also a problem with economy. Specifically, since wavelengths more than those exemplified in FIG. 3, for instance, 8 to 16 or more, may be multiplexed, the problems are more significant in a practical use.

SUMMARY OF THE INVENTION

It is the object of the present invention to eliminate the above problems and provide a demultiplexer device for wavelength-division multiplexed optical fiber communication which can efficiently compensate dispersion and loss, and can decrease active devices such as optical amplifiers.

To accomplish the above object, the present invention is firstly characterized by comprising bifurcate couplers connected in multi stages to branch out the inputted wavelength-division multiplexed optical signal, into the signals correspond to the numbers of the multiplexed wavelength optical filter means disposed on the first branch side of the respective couplers as needed, equalizing fibers disposed on the second branch side of the respective couplers, an optical filter means provided on the second branch side of the coupler in the final stage, optical amplifiers disposed at predetermined positions between the coupler provided in the first stage and the optical filter means provided on the second branch side of the coupler in the final stage. Further, the present invention is secondly characterized in that the optical amplifiers are disposed on the output side of the couplers connected in multi stages in at least every other stage.

Further, the present invention is thirdly characterized in that the optical filter means is a dielectric multi-layer film filter for filtering an optical signal of a predetermined wavelength. Further, the present invention is fourthly characterized in that the optical filter means consists of an optical circulator and an optical fiber grating for reflecting the optical signal of the predetermined wavelength, and it is constructed so that, of the wavelength-division multiplexed optical signals inputted from the coupler and passing through the optical circulator, the optical signal reflected at the optical fiber grating is outputted from the optical circulator.

According to the first to fourth characteristics, the equalizing fibers disposed on the second branch side of the couplers arranged in multi stages provide a common dispersion compensation in the subsequent channels. Accordingly, if the equalizing fibers are uniformly disposed so as to correspond to the respective channels, the dispersion is accumulatively compensated in the channels on the downstream side, that is, the channels on the short wavelength side which are branched by the couplers, and thus it is not needed to particularly increase the amount of the equalizing fibers.

Further, since the amount of the equalizing fiber to be disposed for each channel is not large, the attenuation amount for each channel can be made small. Accordingly, a necessary amount of loss compensation can be provided without placing a optical amplifier at each channel, as shown by the second characteristic.

BRIEF DESCRIPTION OF THE DRAWINGS

FIG. 1 is a block diagram of the demultiplexer device related to an embodiment of the present invention.

FIG. 2 is a block diagram showing a variation example of the filter means in the demultiplexer device related to the embodiment of the present invention.

DETAILED DESCRIPTION OF THE PREFERRED EMBODIMENTS

Figure 3:
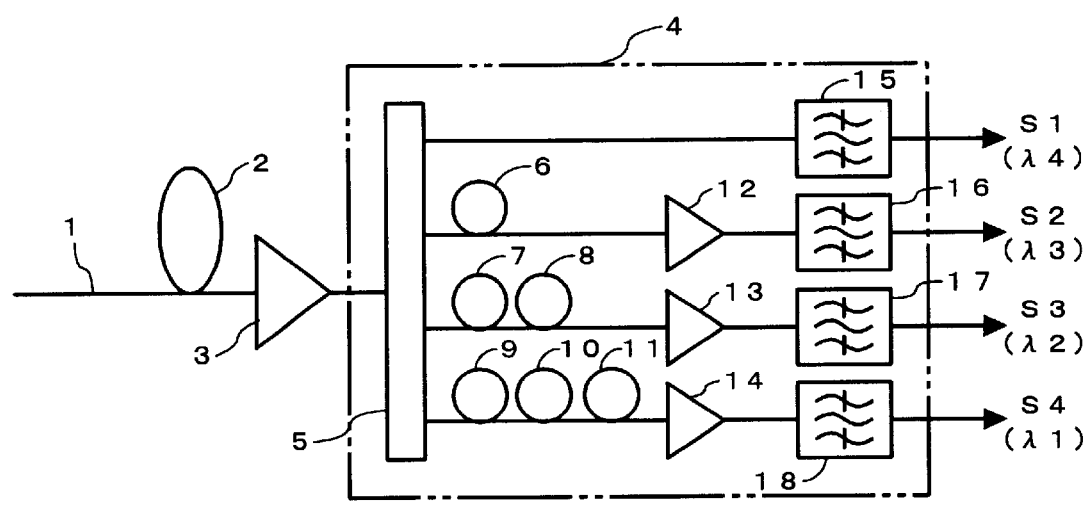
FIG. 3 is a block diagram of the conventional demultiplexer device.

Now, the present invention is described in detail with reference to the drawings. FIG. 1 is a block diagram showing the construction of the demultiplexer device related to an embodiment of the present invention, and the same symbols as FIG. 3 represent the same or identical portions. A demultiplexer device 19 comprises 3 dB couplers 20, 21 and 22, equalizing fibers 23, 24 and 25, an optical amplifier 26, and optical filter 15, 16, 17 and 18. The wavelength-division multiplexed optical signal is first branched by 3 dB coupler 20 of the first stage, and one wavelength-division multiplexed optical signal is inputted to the optical filter 15 and an optical signal S1 having a wavelength of λ4 is extracted as an output.

The other of the wavelength-division multiplexed optical signal branched by the 3 dB coupler 20 passes through the equalizing fiber 23 of the first stage and is inputted to the 3 dB coupler 21 of the second stage. One of the wavelength-division multiplexed optical signals further branched the 3 dB coupler 21 of the second stage is inputted to the optical filter 16, and an optical signal S2 of a wavelength λ3 having passed through the optical filter 16 is extracted as an output. On the other hand, since the other of the wavelength-division multiplexed optical signals branched by the 3 dB coupler 21 is attenuated by the 3 dB couplers 20 and 21 and the equalizing fiber 23, it is amplified by the optical amplifier 26 before inputted to the equalizing fiber 24 of the second stage. Then, the amplified wavelength-division multiplexed optical signal passes through the equalizing fiber 24 of the second stage and is inputted to the 3 dB coupler 22 of the third stage.

One of the wavelength-division multiplexed optical signals branched by the 3 dB coupler 22 of the third stage is inputted to the optical filter 17, and an optical signal S3 of a wavelength λ2 having passed through the optical filter 17 is extracted as an output. The other of the wavelength-division multiplexed optical signals branched by the 3 dB coupler 22 passes through the equalizing fiber 25 of the third stage and is inputted to the optical filter 18, and an optical signal S4 of a wavelength λ1 having passed through the optical filter 18 is extracted as an output.

As described above, in accordance with this embodiment, as apparent from the comparison with that shown in FIG. 3, the length of the equalizing fibers included in the demultiplexer device 19 has decreased (the length of each equalizing fiber is assumed to be the same), and the number of optical amplifiers has also decreased. The length of the equalizing fibers could be decreased as described above, because the respective equalizing fibers 23, 24 and 25 are serially disposed, and because the wavelength-division multiplexed optical signals inputted to the respective optical filters 16, 17 and 18 are compensated for dispersion not only by the preceding equalizing fiber but also by equalizing fibers disposed upstream thereof. Similarly, the optical amplifiers could be decreased because the attenuation amount of the optical signals were decreased by the decrease in the length of the equalizing fibers.

The optical amplifier 26 can be placed not only at the position shown in FIG. 1, but also at any position in consideration of the attenuation amount of the wavelength-division multiplexed optical signal at each coupler and equalizing filter so that the attenuation amount does not exceed a predetermined reference value. If the wavelength spacing of the wavelength-division multiplexed optical signal is determined, the length of the equalizing fiber disposed after the branching at a coupler can also be determined. This allows the degree of the optical signal attenuation to be predicted, the amplification factor and number of the optical amplifiers as well as the arrangement position thereof can previously be determined based on the prediction. The optical amplifiers can be increased if the number of wavelength-division multiplexings is larger than the example in FIG. 1, and in this case, if the wavelength spacings are equal, it is preferred that the optical amplifiers are also placed at equal spacings.

The above described optical filter is assumed to be the dielectric multi-layer film type optical filter, but, instead of using such optical filter, the optical filter may be constructed, for instance, by a combination of an optical circulator and an optical fiber grating as shown in FIG. 2. In FIG. 2, an alternate to the above optical filter 15 is assumed. An optical fiber grating 28 is connected to an optical circulator 27, and a nonreflective terminating equipment 29 is connected to the optical fiber grating 28. The 3 dB coupler 20 is connected to the input side of the optical circulator 27, to which a wavelength-division multiplexed optical signal branched by the 3 dB coupler 20 is inputted. The inputted wavelength-division multiplexed optical signal passes through the optical circulator 27 and is inputted to the optical fiber grating 28. At the optical fiber grating 28, only the optical signal of a desired wavelength, in this case, the optical signal of wavelength λ4 is reflected according to the characteristics of the optical fiber grating 28. The reflected optical signal of the wavelength λ4 returns to the optical circulator 27, and it is outputted from the output side of the optical circulator 27 as a signal S1. The optical signals other than that of the wavelength λ4 pass through the optical fiber grating 28 and are absorbed at the nonreflective terminating equipment 29.

If filter means consisting of a combination of the optical circulator 27 and the optical fiber grating 28 are arranged in multi stages instead of the filters 15 to 18, optical signals of two or more wavelengths can be branched from the optical signal branched by one coupler.

As seen from the above description, in accordance with the present invention, couplers are placed in multi stages, and an equalizing fiber is disposed at one of the branches. That is, a plurality of equalizing fibers are serially disposed. Accordingly, at the channel of a later stage, that is, at a channel for shorter wavelength signal, the equalizing fibers disposed at the channels of the prior stages or channels for longer wavelength signal accumulatively act to perform dispersion compensation. As a result, as the whole demultiplexer device, the length of the equalizing fibers can be reduced.

Since the length of the equalizing fiber to be disposed for each channel is not large, the attenuation amount of the optical signal for each channel can be made small. Accordingly, a necessary amount of loss compensation can be made without always placing an optical amplifier at every channel, as in the invention of claim 2. Thus, in accordance with the present invention, a highly reliable demultiplexer device can be provided by reducing the number of parts, and the cost effectiveness of a the total communication system including the demultiplexer device can be increased by the reduction in active devices.

What is claimed is:

1. A demultiplexer device for wavelength-division multiplexed optical fiber communication comprising:
   optical fiber couplers connected in multi stages for branch out an inputted wavelength-division multiplexed optical signal into the number of wavelength-division multiplexings;

optical filter means disposed at the first branch side of each optical fiber coupler;

dispersion equalizing optical fibers disposed at the second branch side of each optical fiber coupler as needed;

an optical filter means provided on the second branch side of the optical filter coupler of the final stage; and optical amplifiers disposed at predetermined positions between said optical fiber coupler provided in the initial stage and the optical filter means provided on the second branch side of the optical fiber coupler of the final stage.

2. A demultiplexer device for wavelength-division multiplexed optical fiber communication as set forth in claim 1, wherein said optical amplifiers are disposed on the output side of at least every other stage of said optical fiber couplers connected in multi stages.

3. A demultiplexer device for wavelength-division multiplexed optical fiber communication as set forth in claim 1, wherein said optical filter means is a dielectric multi-layer film filter for filtering an optical signal of a predetermined wavelength.

4. A demultiplexer device for wavelength-division multiplexed optical fiber communication as set forth in claim 1, wherein said optical filter means consists of an optical circulator, and an optical fiber grating for reflecting an optical signal of a predetermined wavelength, and said optical filter means is constructed so that, of the wavelength-division multiplexed optical signals inputted from said optical fiber coupler and passing through said optical circulator, the optical signal reflected at said optical fiber grating is outputted from said optical circulator.

* * * * *

UNITED STATES PATENT AND TRADEMARK OFFICE
CERTIFICATE OF CORRECTION

PATENT NO. : 6,115,156
DATED : September 5, 2000
INVENTOR(S) : Tomohiro Otani et al.

It is certified that error appears in the above-identified patent and that said Letters Patent is hereby corrected as shown below:

<u>Title page,</u>
Item [30], cancel "August 11, 1996" and insert -- November 8, 1996 --.

Signed and Sealed this

Thirtieth Day of July, 2002

*Attest:*

JAMES E. ROGAN
*Director of the United States Patent and Trademark Office*

*Attesting Officer*